United States Patent [19]

Derby

[11] 4,378,941

[45] Apr. 5, 1983

[54] BIRDING GAME METHOD

[76] Inventor: Paul A. Derby, 555 Glen Dr., San Leandro, Calif. 94577

[21] Appl. No.: 240,758

[22] Filed: Mar. 5, 1981

Related U.S. Application Data

[63] Continuation of Ser. No. 85,854, Oct. 18, 1979, abandoned.

[51] Int. Cl.³ .............................................. A63F 3/00
[52] U.S. Cl. .................................... 273/273; 273/244
[58] Field of Search ............... 273/273, 254, 236, 248, 273/243, 249, 244; 434/129

[56] References Cited

U.S. PATENT DOCUMENTS

| | | | |
|---|---|---|---|
| 1,747,767 | 2/1930 | French | 273/249 |
| 1,978,107 | 10/1934 | Hoffmann | 273/284 X |
| 3,711,966 | 1/1973 | Dreak | 273/236 X |
| 4,016,939 | 4/1977 | Thron | 273/244 |
| 4,030,210 | 6/1977 | Stebbins et al. | 273/236 X |
| 4,078,803 | 3/1978 | Te | 273/248 |
| 4,078,804 | 3/1978 | Coster et al. | 273/284 |
| 4,089,527 | 5/1978 | Roth | 273/249 |

Primary Examiner—Richard C. Pinkham
Assistant Examiner—Scott L. Brown
Attorney, Agent, or Firm—Naylor, Neal & Uilkema

[57] ABSTRACT

An educational and entertaining game for teaching and improving skills of players in the hobby of bird watching. The game includes a four-sided playing board having a continuous path around the perimeter, the path being partitioned into spaces, recessed; all of the spaces being blank with the exception of the four corners, which represent the four individual starting points for the players.

The other apparatus includes the "tiles" which each player uses to construct his segment of the playing board path; four player identification pieces in different bird shapes; a set of playing cards depicting birds; a set of "mystery bird" cards providing clues to bird identities; 2 dice to determine the players' moves by chance; a binder containing bird identification information; four acetate-covered identical lists of of birds; four grease pencils (China Markers).

Each tile represents a different habitat for birds, or directs players to clues for identifying birds, or directs them to another segment of the board. The game object is for each player to correctly match the birds with their habitats, or to identify them by use of written clues. The winner is the player who first identifies a predetermined number of birds on the list or the most birds within a given period of time.

1 Claim, 13 Drawing Figures

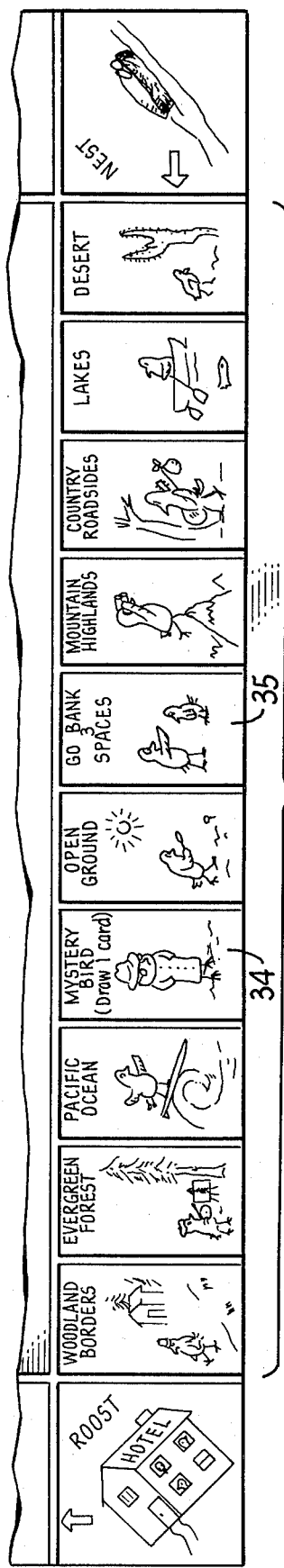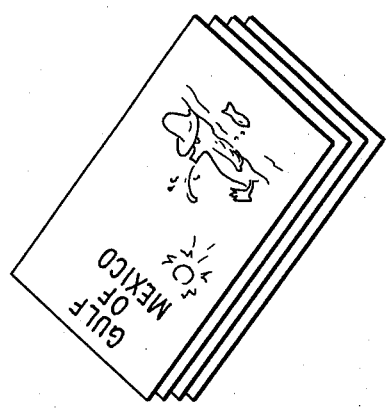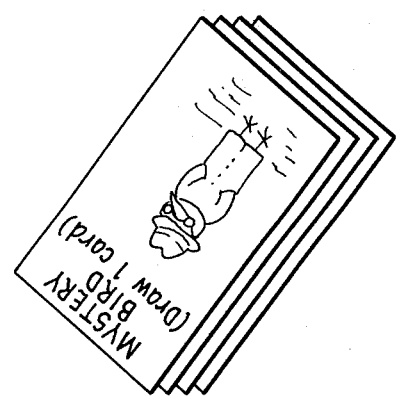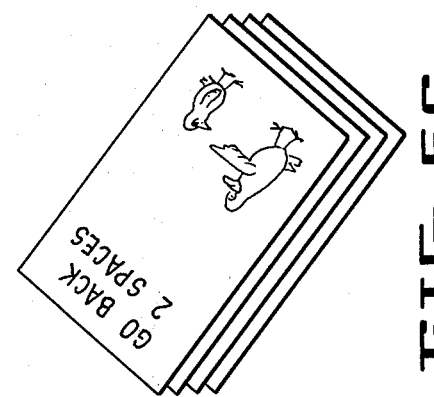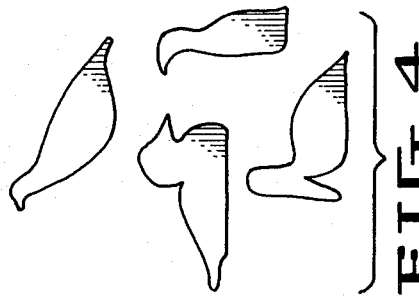

BIRDING GAME METHOD

This is a continuation of my co-pending application, Ser. No. 085,854, filed Oct. 18, 1979 now abandoned.

This invention relates to board games, being a recreational and educational game connected with the identification of birds. While there are numerous books, pictures, slides, records and tapes dealing with the subject of bird watching and bird identification, also known as "birding," there are no games covering the subject to the knowledge of this inventor, particularly in the area of relating individual species of birds to definite types of habitat.

BACKGROUND AND SUMMARY OF THE INVENTION

It is generally known that certain species of birds are customarily found in particular types of habitats. For example, roadrunners are generally found in the desert. The Birding Game is a board game which provides various habitats and requires that the players, whose markers land by chance upon a given habitat, match the bird pictures on cards in the players' hands with the habitats. In addition to the habitats, the game provides other clues, such as descriptions of the habits and sounds of birds by which they can be identified.

The principle of the game is based upon the concept of the Christmas Bird Count, or Census. This is an annual event wherein various groups of birders throughout the United States meet and during a selected 24 hour period within specified dates and within specifically selected limited areas, identify (as well as count) the birds in their sectors. Considerable rivalry has built up over the years, based upon the number of different birds group members have been able to identify, the winning group being that which has identified the highest number of different kinds of birds. Since different birds select different types of habitat, the selection of the geographical areas in which to conduct these counts becomes important to the competitors.

It has been estimated that there are about ten million birders throughout the United States, and that their number is expanding. This game is designed to educate the beginners as to the identity of birds most likely to be found in a given environment, to sharpen the skills of the more experienced birder and of the expert, and to entertain those who are interested in birds when it is not possible for them to be afield in order to enjoy their hobby.

A unique feature of the game is that, just as birders select the geographical areas in which to look for birds, the players, subject to the rules of the game, select their preferred habitats by constructing their own segments of the game board. Thus the path around the perimeter of the board can be varied, from game to game, depending upon the players' selections. The winning player is the one who, with the aid of those players who must pass through his chosen habitats (his "birding group") has identified the most birds on his list within a stated time limit, or the first player to reach a predetermined number of birds, whichever goal the players set at the beginning of the game.

The prior art of which I am aware consists of U.S. Pat. Nos. 3,817,531, 3,939,578, 3,970,313, 4,010,955 and 4,118,035, none of which discloses a comparable game or any game in which the players construct their own playing segments of the game board.

To accomplish the purpose of the game, the following apparatus is provided:
(1) A square board (cardboard or other substance) designed with a continuous path around the perimeter; each corner of the board being the starting point for a player. The remainder of the path consists of 40 recessed blank slots in the board, 10 to each side. In the board's infield are marked spaces, three for card supplies and three for discarded cards:
(2) Forty-four "tiles" (heavy cardboard, wood or other substance), representing habitats, "mystery birds" and directions to players;
(3) A set of playing cards, each card having a bird picture and a number;
(4) A set of "mystery bird" cards, upon which the habits of a particular bird are described; each card bearing a number;
(5) Four markers, each in the shape of a different bird, to identify players;
(6) Two dice, to determine player priority and chance moves;
(7) Binder containing identification information, matching birds with habitats and habits;
(8) Four acetate-covered birding lists;
(9) Four grease pencils (china markers), for marking birding lists.

BRIEF DESCRIPTION OF DRAWINGS

FIG. 3 shows a completed game board setup for one side of the board;
FIG. 4 is a flat-side view of the markers;
FIG. 5(A) is a representative view of a habitat tile;
FIG. 5(B) is a representative view of a mystery bird tile;
FIG. 5(C) is a representative view of a directional tile.

DESCRIPTION OF PREFERRED EMBODIMENT

In putting the concept of the game into concrete form numerals will be used to identify like reference points on the drawings.

Figure 1:
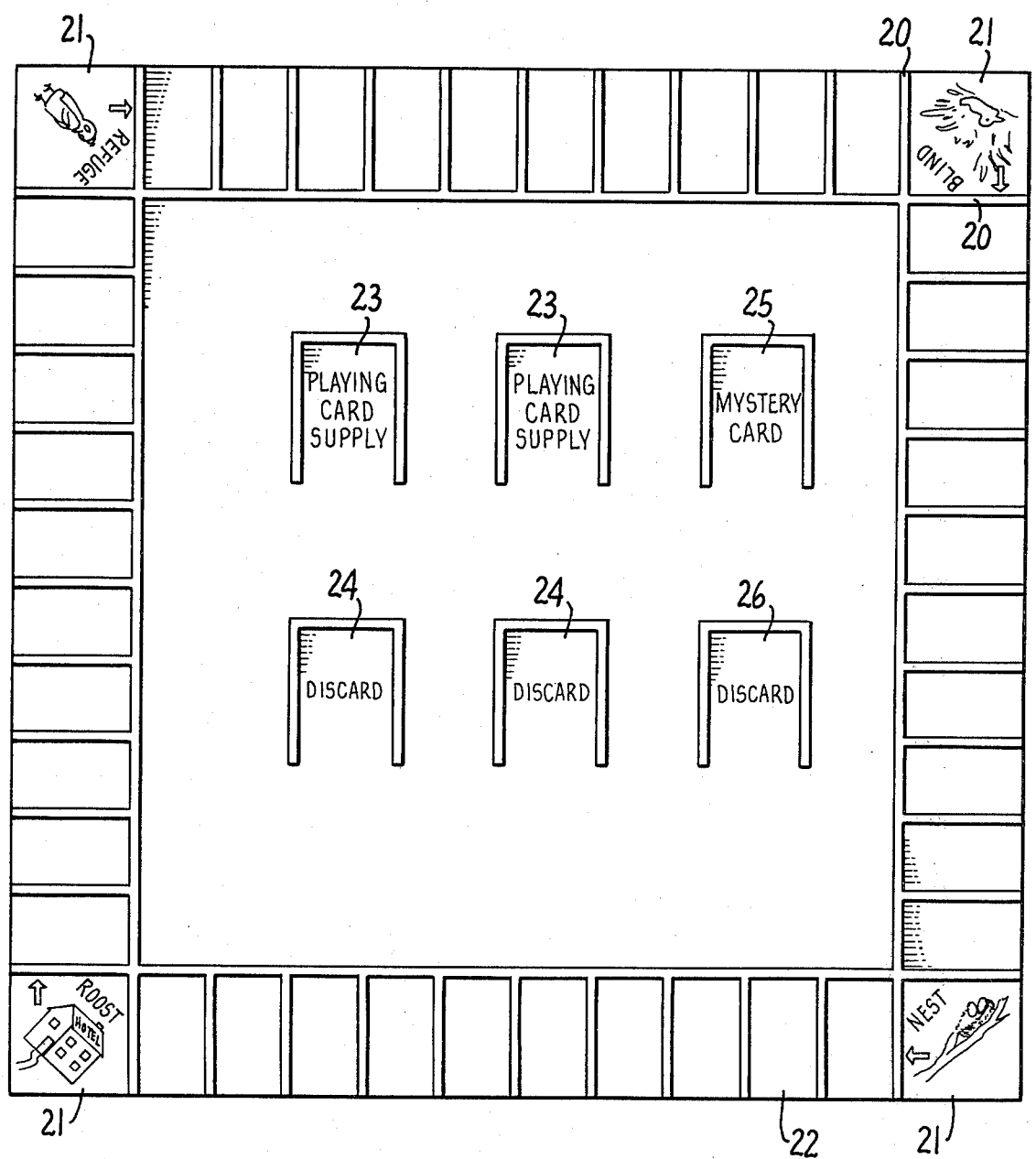
FIG. 1 is the top plan of the game board.
Figure 2:
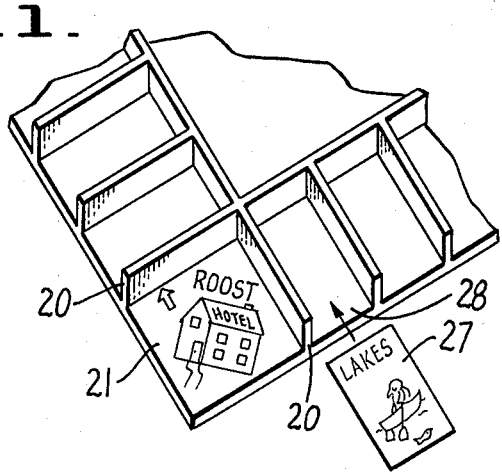
FIG. 2 is the perspective view of a corner of the game board and of the manner of fitting a tile into a blank space.

The game board shown in FIG. 1 is square and lies flat. The edges of the board are segmented by slightly raised partitions (20) into four square corners (21), each having a distinctive designation and drawing, and into forty equal rectangular blanks (22), ten blanks to a side. In the infield portion of the board are six spaces, two to be used for storing the initial playing card supply (23); two for storing discarded playing cards (24); one for storing the mystery bird card supply (25) and one for storing the mystery bird discards (26).

Forty-four "tiles" (27) are provided. These are rectangles of stiff cardboard or other suitable substance, designed to fit into the blank recessed spaces on the edges of the game board (28). Thirty-six of these tiles represent bird habitats [FIG. 5(A)], four represent mystery birds [FIG. 5(B)] and four provide direction [FIG. 5(C)] to the player. To differentiate the tiles for ease of selection, each group of tiles (habitat, mystery bird and directional) are of a different color than the other group. The face of each habitat tile provides the designation of the habitat (e.g. Gulf of Mexico [FIG. 5(A)] and a distinctive drawing; the mystery bird cards are so designated on the cards, have a drawing to identify the card and instructions to "draw 1 card" [FIG. 5(B)]. The directional cards provide instructions to go back from 1 to 4 spaces, depending upon the card, and a distinctive drawing [FIG. 5(C)].

Figure 6:
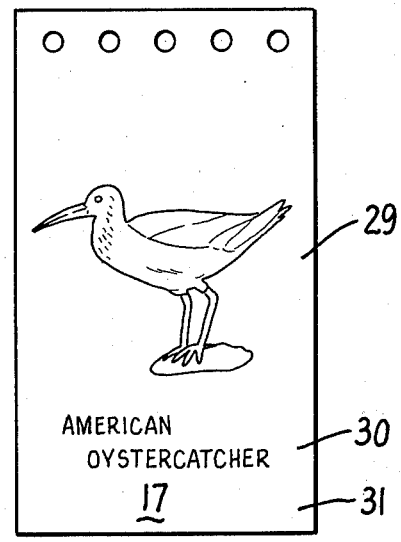
FIG 6 is a representative view of the face of a playing card.
Figure 7:
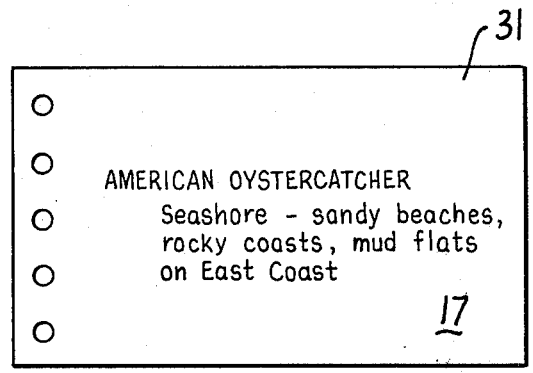
FIG. 7 is a representative view of a binder-insert answer sheet for habitats.

The playing cards depict birds [FIG. 6(29)] which may be found in one or more of the habitats represented by the tiles. The card illustrated in FIG. 6 is used with the beginners set, providing the name (30) of the bird as well as its picture. It is contemplated that additional sets will be provided; one without the birds' names, for players of intermediate skill; one or more sets on which only distinctive bird markings or features would be indicated, for experienced birders and experts. Each playing card bears a number (31), which corresponds to the number on the paper insert [FIG. 7] in the bird section of the Answer Binder [FIG. 11].

Figure 8:
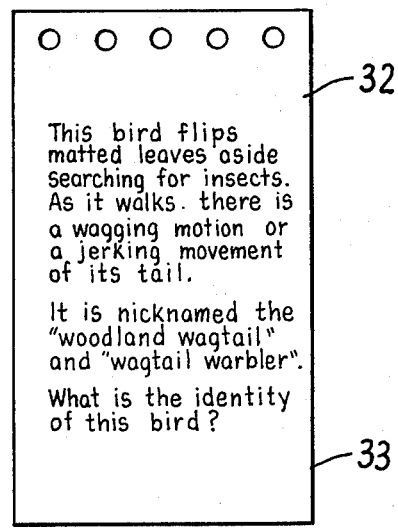
FIG. 8 is a representative view of the face of a mystery bird card.
Figure 9:
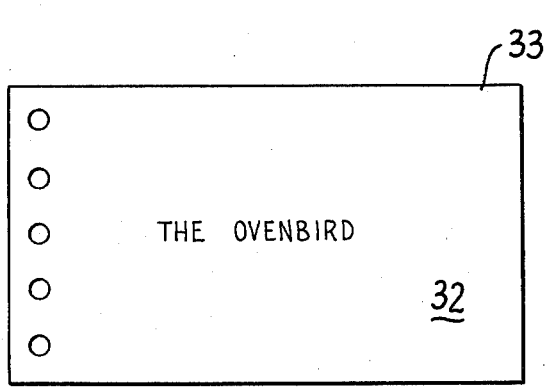
FIG. 9 is a representative view of a binder-insert answer sheet for mystery birds.

A set of mystery bird cards [FIG. 8] is provided. Each such card supplies clues to the identity of a specific bird (32), and players resort to this supply whenever their markers land on a mystery bird tile in the course of a game. Each card bears a number (33) which corresponds to the numbered paper insert [FIG. 9(33)] in the mystery bird section of the Answer Binder.

There are four differently shaped (bird shaped) playing pieces or markers [FIG. 4], to be selected and used by the players to identify their places on the board, and two dice for the purpose of determining the players' order of priority for selection of the tiles, the selection of starting corner, the order of play and the number of spaces over which a marker is to be moved.

Figure 11:
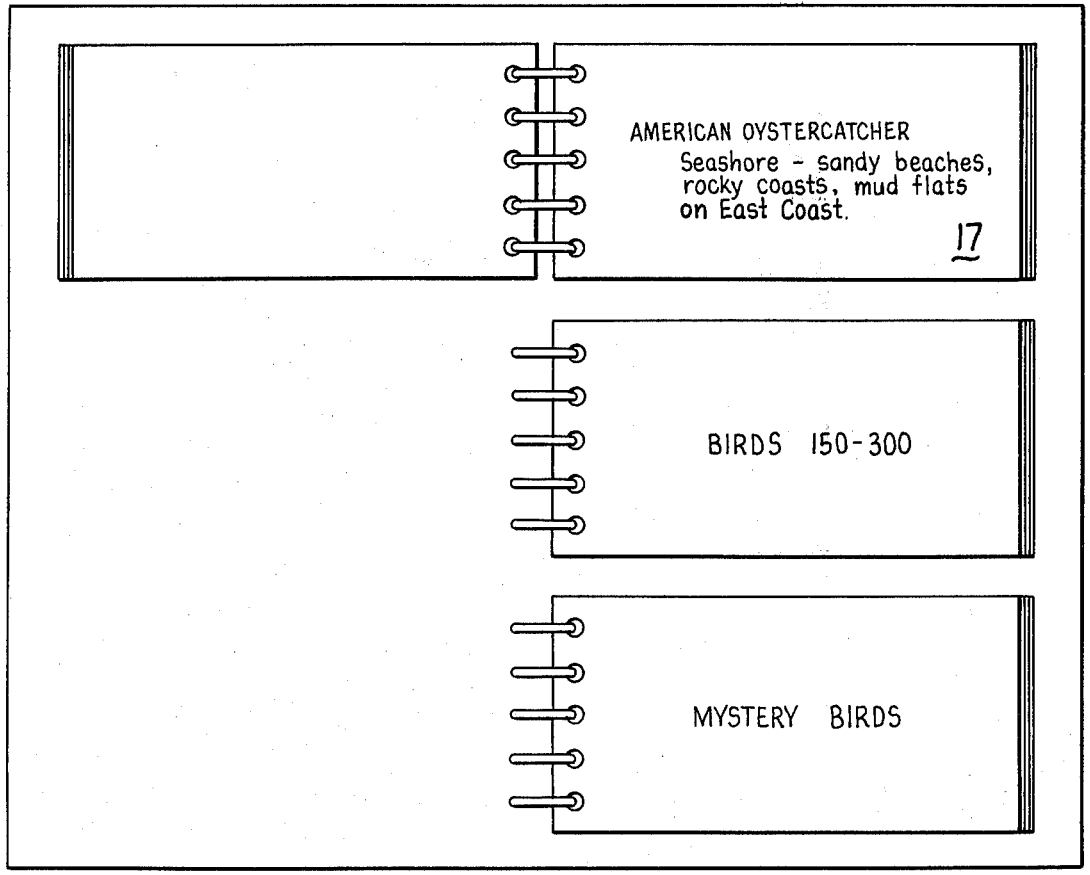
FIG. 11 shows a binder containing paper inserts providing habitat and mystery bird answer sheets.

An answer binder [FIG. 11] is provided, which contains paper inserts bearing numbers which match the numbers on the playing cards and the numbers on the mystery bird quiz cards. The inserts are designed so that the numbers appear on the right hand margin of each page, with the identifying information inset to the left, so that an answer can be readily obtained without the viewer also observing additional answers pertaining to other birds. Although a binder is proposed, other means, such as a book of answers or card index could be employed.

Figure 10:
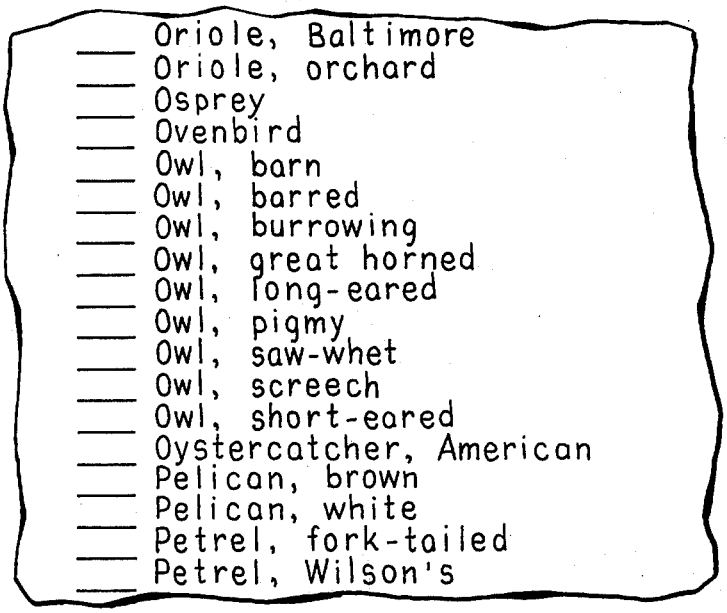
FIG. 10 shows an excerpt from an acetatecovered bird list.

Finally, there are four acetate-covered bird lists [FIG. 10] with four grease pencils to be used in checking birds which have been identified by the players. This bird list is arranged alphabetically rather than by species or family group, to enable inexperienced players to more rapidly locate the appropriate bird on the list. However, standard birding lists could be used with the game, if the players so desire. At the end of play, the acetate can be wiped clean with a soft cloth or tissue, and the lists can be reused.

PLAY OF THE GAME

The game may be played by two, three or four players. The board is placed upon a table or flat surface. The forty-four tiles are spread face up over the infield of the board, or on an empty space on the table or surface. The dice are used to determine which player will first choose a starting corner, a marker and the first tile; that player shall also be the dealer. The player having the next highest number will then take the next choice of corner, marker and tile, and so on.

When the order of choice has been established, the first player selects a tile and places it in any one of the 10 spaces to the left of his starting point; the next player then makes a selection and does the same thing in his section. In the course of selection, each player must select one mystery bird tile [FIG. 3(34)] to be inserted wherever he chooses in his segment of the board; he may choose one or more directional tiles (e.g. "go back 3 spaces") (35). Selecting in rotation, each of the four players will have received 11 tiles, one other than the mystery bird tile will be held in reserve by each player. The player now makes a "final" adjustment as to the arrangement of his segment of the board (36) and determines which tile he wants to hold in reserve (37). Each player must state that his segment of the board is fixed before play can commence.

In effect, the players have each selected the habitats in which his "group" will be looking for birds. The opposing players temporarily become members of the "group" as they pass through a player's own segment of the board. Presumably, a player's tile selections will depend upon his own and his opponent's known strengths and weaknesses in relating birds to particular types of habitats; also upon his knowledge as to which habitats attract more birds of different species than others.

If his opponents possess more expertise than he does, he may select more difficult habitats for his own section in order to benefit from their skill in identifying birds in his segment of the board, for which he will share credit. In addition, he may want to remove a specific habitat and replace it with his reserve tile if it appears from the cards in his hand that this might increase his opportunity to match additional birds with the new habitat.

The playing cards are divided into two packs and shuffled. One pack is placed in one of the areas of the board marked for playing cards [FIG. 1(23)]. From the other pack the dealer deals 10 cards in clockwise rotation to the players, starting with the player on his left, and places the remainder of the pack in the other area of the board marked for playing cards (23).

The mystery bird cards are shuffled and placed on the mystery bird space on the board (25).

One player is designated to be in charge of the Answer Binder [FIG. 11] and required to verify identifications, if necessary, by matching the number of the card in question with the corresponding number of the answer.

Each player is supplied with a bird list [FIG. 10] and grease pencil, and each places his marker [FIG. 4] on his selected square [FIG. 1(21)] to the right of his segment of the game board.

The players roll the dice to determine which player will start the game, lowest number going first and followed by the other players in clockwise rotation around the board. To illustrate the game, assume that the first player rolls a 5 and that the 5th space in the segment which he "owns" is occupied by the MUD FLATS habitat card. The player searches among the cards in his hand to determine whether or not he has a bird which is customarily found in that habitat. Assuming that he possesses the American Oystercatcher and correctly associates it with mud flats [FIGS. 6 & 7] he would mark his bird list opposite "Oyestercatcher, American" [FIG. 10], put the card face down on one of the two discard spaces [FIG. 1(24)] on the board and draw two playing cards from either pack on the board (23). If, while in his own segment, he does not attempt to identify a bird in his hand with a habitat, he does not lose or gain a card; if he makes an erroneous identification, he must forfeit the card to the discard space. Having either identified a bird or failed to do so, the player has completed his turn and the next player begins.

To continue the illustration, assume that the next player rolls a 12 with the dice, thus completely passing his own segment of the board and landing on an opponent's habitat. If the player can correctly relate a bird in his hand with that habitat, he must do so, place the card in one of the discard spaces and draw one new card from one of the packs. Both that player and the player (the "owner") whose area contains that habitat check the bird on their lists. If, however, the player landing on the habitat can not match it with a bird, or makes an erroneous determination, he, having returned the misplayed card to his hand if he has played a card, must allow the owner of that habitat to draw any card from his hand. The owner then can attempt to match a bird in his own hand (including the card just received from the opposing player) with the habitat; if he does not attempt to identify a bird, he does not lose a card but if he does attempt to identify a bird and is in error, he must forfeit the card to the discard space. In the event that he is successful, the owner alone gets credit for the "find" on his list, discards the card and draws another one from one of the packs. Play is then continued by the next player.

If a player lands on "mystery bird" he must draw a mystery bird card from the pack [FIG. 1(25)] and attempt to answer the question. If he succeeds, and has not previously identified the bird on his list by habitat, he, and the owner of the mystery bird tile check their lists opposite the bird. If he has previously checked the bird on his list and the owner has not, the owner can do so. If the player drawing the mystery bird card is not on his own segment of the board and fails to properly identify the bird, the owner of the segment has the opportunity to do so (if he has not already identified it with a habitat) and, if successful, checks the appropriate bird on his list. If the owner fails, there is no penalty.

If the player lands on one of the direction tiles (e.g. "go back 3 spaces") [FIG. 3(35)], he must comply and then attempt to match a bird card to that habitat, or draw a mystery bird card if that is where he lands, subject to the same rules as set forth above. Presumably, the "owner" will have placed the directional card to lead to the habitat which, in his opinion, will be the most productive of birds (either because of his knowledge of that habitat, or that which he anticipates his opponent will have).

Each time that a player lands on or passes his starting point, he draws sufficient playing cards so that he will have at least six cards in his hand as he commences another circuit of the board. If he already has six or more cards in his hand, he draws 1 additional card when landing on or passing his starting point.

Should the players run out of a supply of playing cards during the game, the discard piles can be moved into the card supply spaces and the game continued. The same thing is true for the mystery bird cards.

At any time during the game, immediately prior to his own turn a player can, one time only, substitute the reserve tile [FIG. 3(37)] for any tile which is in his segment of the board, other than the mystery bird tile.

If only two players play the game, they each construct two sides of the board, the one in front of the player and the one directly opposite him, each having one reserve tile for each segment, and the rules otherwise remaining the same—i.e., each player owns two segments of the board. If three persons play, the open side of the board is filled successively in the same order of selection after the three players have completed their own eleven choices; each player will then select a tile other than the mystery bird tile in order for 3 turns, placing the selected tiles in the remaining open spaces; the mystery bird tile will fill the tenth space and the leftover tile will be the reserve tile. The player who won the right to select the first tile in the game will have the right to substitute the reserve tile in the unowned sector for another tile in that sector at any time immediately before his turn. Players landing on the spaces on the unowned side apply the rules as if they were the owners of the segment of the board and do not get credit for other players' finds when those players pass through this segment of the board.

The winning player is the one who, according to his check list, has identified the most birds (with the aid of his "group") of all of the players within the time limit set at the beginning of the game, or in the alternative, the first player to reach a predetermined number of birds, whichever goal the players set at the beginning of the game.

It will be appreciated that the same game concept can be readily employed to match up various objects or items with characteristics of the objects which tend to identify them. It is therefore intended that the invention be limited only by the scope of the appended claims.

What is claimed is:

1. A game for the matching of bird species and their geographical habitats comprising providing a plurality of tiles bearing on their faces habitat identification information, providing a plurality of playing cards bearing on their faces bird species identification information, arranging said tiles collectively in face-up position so that each of the players may choose his own make-up of tiles for the play of the game, selectively apportioning tiles among the players in accordance with their respective choices whereby each player is responsible for a selection of habitat descriptions to be matched with the bird species of said cards, displaying the selectively apportioned tiles in face-up position adjacent the players who chose them, distributing a predetermined number of said cards as card hands in face-down condition to each of the players, and sequentially comparing said card hands with predetermined displayed tiles to discern species and habitat matchings.

* * * * *